Dec. 1, 1970 L. C. HARDISON 3,543,485
CENTRIFUGAL PARTICLE SEPARATOR
Filed Sept. 23, 1968

INVENTOR:
Leslie C. Hardison

BY:
ATTORNEYS

3,543,485
CENTRIFUGAL PARTICLE SEPARATOR

Leslie C. Hardison, Norwalk, Conn., assignor to Universal Oil Products Company, Des Plaines, Ill., a corporation of Delaware
Filed Sept. 23, 1968, Ser. No. 761,467
Int. Cl. B01d 45/12; B04c 3/00
U.S. Cl. 55—398                                    4 Claims

ABSTRACT OF THE DISCLOSURE

An improved vertically aligned centrifugal particle separator wherein a multiplicity of static vanes extend upward from and are circumferentially fixed around a static spinner. The spinner has a hub and blades and is axially mounted over a particle laden gas inlet. A gas stream rising from the gas inlet is forced into an ascending spiral by the spinner blades. Relatively dense particles entrained in the gas stream are thrown centrifugally outward and are either passed between static vanes or strike static vanes, and in either case are deflected into a particle receiving section, which is the space bounded by the outer surfaces of the gas inlet and the static vanes and the inner surface of the centrifugal particle separator.

---

This invention relates to an improved vertically aligned centrifugal particle separator wherein a multiplicity of static vanes extend upward from and are circumferentially fixed around a static spinner. The spinner has a hub and blades and is axially mounted over an inlet for particle laden gas. A gas stream rising from the gas inlet is forced into an ascending spiral by the spinner blades. Relatively dense particles entrained in the gas stream are thrown centrifugally outward and are either passed between static vanes or strike static vanes, and in either case are deflected into a particle receiving section, which is the space bounded by the outer surfaces of the gas inlet and the static vanes and the inner surface of the centrifugal particle separator wall.

Heretofore, centrifugal particle separators, though having been in use for many years, have been predominantly used to remove dust particles of fine and moderate size entrained in particle laden gases. For this reason, conventional centrifugal particle separators have been designed to remove entrained particles which follow air currents flowing through the centrifugal particle separator. This is an effective approach when used to separate small, light particles having only slight inertia which is easily overcome by the forces present in the gas currents.

There are currently several variations of centrifugal particle separators in use. A cyclone particle separator provides for the introduction of a tangential gas stream carrying entrained particles into a drum. The gas flows around the drum and imparts a centrifugal motion to the particles, thereby throwing the entrained particles to the periphery of the drum, where they are channeled into a collector bin. The clean gas is normally withdrawn through an axial overhead outlet. Occasionally skimming louvres are positioned near the periphery of the drum, outside of the gas inlet, to skim the outer circumferential layer of the gas, which contains the greater portion of dust particles, thereby preventing this portion of the particles from becoming reentrained in the main portion of the gas stream. When used to separate larger, denser particles from a gas stream, however, this embodiment presents certain disadvantages. One problem is that the skimming louvres are virtually useless since the dense particles bounce off these louvres and remain inside the space bounded by the louvres. This happens because the inertia of the particles prevents the particles from being carried with the gas stream through the openings between the louvres, but rather causes these particles to strike the skimming louvres and rebound from louvre to louvre.

Another embodiment of a centrifugal particle separator which is sometimes used involves an axial particle laden gas inlet into the hub of a rotor. The rotor imparts a centrifugal force to the gas thereby forcing the heavier particles to the outside of the rotor while the cleaned gas is exhausted overhead. On the wall surrounding the rotor are one or two lipped slots which act as scoops with respect to the outer gas layer. Again, however, if heavy, dense particles are entrained, the centrifugal force of the rotor will be great enough to cause these particles to strike the walls surrounding the rotor before the particles have traveled far enough circumferentially to reach the particle collector slots. These particles will then rebound among the rotor blades and against the wall, thereby damaging these components as well as possibly crushing the particles themselves, depending upon the composition of the particles. It can be seen that this embodiment also is inadequate in coping with the problems involved in separating heavy dense particles from an entraining gas stream.

It is an object of this invention to provide a centrifugal particle separator which is capable of readily separating large, dense particles from a gas stream. It is a further object to effect this separation with a minimum of striking and impingement of the entrained particles upon the components of the centrifugal particle separator. Additional objects include reducing wear and erosion of the components of the centrifugal particle separator, due to the reduced extent of impact of the particles upon these components, as well as the subsequent collection of the entrained particles intact.

One particularly appropriate application of this invention is to the recovery of catalyst support particles or absorbent particles from a rising gas stream, such as are used in effecting chemical reactions in industrial processes. One illustrative application exists where alkalized alumina particles are introduced into the base of a column along with a rising gas stream containing sulfur oxides. The sulfur oxides are absorbed on the alumina particles and the alumina particles are then separated from the gas stream using the improved centrifugal particle separator described herein. Similarly, catalyst supports can be recovered from the rising process gas stream in thermocatalytic cracking of hydrocarbons. Although some applications are more effective than others, any process in which it is desired to recover relatively large solid particles from a rising gas stream is an appropriate application of this invention.

In a broad aspect this invention is a vertically disposed centrifugal particle separator comprising an axially mounted particle laden gas inlet with a static spinner, having a hub and spinner blades, vertically mounted thereover, a multiplicity of static vanes vertically mounted concentrically around and extending vertically upward from said spinner and uniformly positioned with respect to said spinner blades, an outer shell positioned radially outward from said inlet and said static vanes, the inner walls of said shell together with the outer surfaces of said static vanes and said gas inlet forming a particle receiving section, and an overhead processed gas outlet, whereby relatively dense entrained particles are thrown towards the static vanes by the centrifugal force from the spiraling motion in the gas stream as induced by the spinner blades, and are deflected into the particle receiving section.

The static vanes can be considered to be comprised of two parts, an inner portion and an outer portion. The terms inner portion and outer portion as used herein refer to the continuous verticle parts of each static vane. The inner portion of each vane has an edge which is at all times nearer the spinner axis than is any part of the outer portion. The relative positioning of the static vanes is determinative of the extent of success in the operation of this invention. As the gas stream and entrained particle are introduced through the vertical inlet, the gas stream undergoes a spiraling motion induced by passage between the static blades of the spinner as a result of the forces exerted on the gas stream by the spinner blades. This spiraling motion produces both an axial and a centrifugal force on the entrained particles. The centrifugal force component tends to move the particles tangentially outward from the gas stream spiral but is resisted by gas resistance, or drag. For larger particles, gas resistance is negligible, and since the forces on each particle remain substantially constant once spiraling is induced, the horizontal velocity component of each particle is in a straight line tangential to a concentric circle around the spinner axis at the position of the particle. For this reason, particles which are positioned near the walls of the gas inlet prior to passing between the spinner blades, emerge from the spinner traveling with only a slight radial component with respect to the spinner axis. Since these particles are near the static vanes when leaving the gas inlet, they have only a short horizontal distance to travel before reaching the static vanes, and hence do not rise very high in the centrifugal particle separator, thereby striking the static vanes, or passing between the static vanes near the bottom edges of the static vanes. To prevent crushing or damage to the particles and to insure that the particles will be deflected into the particle receiving section of the centrifugal particle separator, it is desirable for the angle of incidence of a particle impinging upon a static vane to be as small as possible. Thus, the bottom edges of the static vanes are positioned to approach tangetnial alignment with respect to the spinner axis, the outer portions of the vanes being only slightly further from the spinner than are the inner portions of the vanes.

From the bottom to the top of the static vanes, the angle of deviation of the inner portion of the static vanes from a line radiating from the spinner axis ranges from the angle whose sine is equal to the radius of the gas inlet divided by the distance of the inner edge of the static vanes from the spinner axis to the angle whose sine is the radius of the gas inlet minus the radius of the spinner hub divided by the distance of the inner edge of the static vanes from the spinner axis. In keeping with this relation, the nearer the gas inlet is to being co-extensive with the inner extremities of the bottom edges of the static vanes, the smaller is the deviation of the bottom edge of the inner portion of every static vane from tangential alignment. Also, the greater the radius of the spinner hub, the greater is the angle which the top edge of each static vane makes with a radial line from the spinner axis.

From the aforesaid relationships it can be seen that the inner portion of each of the vanes is shaped in the form of a helix. The necessary height of the static vanes may be determined from the velocity of the gas stream at the inlet and the distance between the spinner hub and the static vanes. Because of the relationship involved, the entrained particles which pass between the spinner blades near the walls of the gas inlet pass into the particle receiving section near the bottoms of the static vanes. Similarly, the entrained particles which pass between the spinner blades near the spinner hub pass into the particle receiving section near the tops of the static vanes. This situation exists because the particles all have substantially the same vertical velocity component. Where there is a greater horizontal distance for the particles to travel in order to reach the static vanes, the vertical velocity component will carry these particles proportionally higher before reaching the static vanes.

Since the bottom edges of the vanes approach tangential alignment with respect to the spinner axis, and since the top edges of the vanes approach an angle with a radial line from the spinner axis whose sine is the radius of the gas inlet minus the radius of the spinner hub divided by the distance of the inner edge of the static vanes from the spinner axis, the maximum angle alignment change which can occur is a change of 90°, or one quarter of the pitch of the helix. Thus, an appropriate height of the static vanes approaches one quarter of the pitch of the helix.

In brief, a desirable configuration of the static vanes occurs when they are characterized as being comprised of an inner and an outer portion, and said inner portion is constructed as a section of a helix and extends throughout the length approaching one quarter of one pitch of said helix, the top edge of said inner portion approaching radial alignment with respect to said spinner and the bottom edge of said inner portion approaching tangential alignment with respect to said spinner. In conjunction with this, a preferred configuration of the outer portion exists where each of said outer portions of said vanes is curved so that the outer portion of each vane extends farther in the direction of the leading edges of the spinner blades than does the inner portion of the same vane. When the static vanes are shaped as heretofor described, the greater portion of the entrained particles ascend from the spinner and pass laterally through the openings between vanes into the particle receiving section of the centrifugal particle separator, where they are prevented from re-entering the center of the centrifugal particle separator by the reverse sides or outer surfaces of the curved outer portions of the static vanes. The particle receiving section is bounded by the inner surface of the outer shell or wall of the centrifugal particle separator and the outer surfaces of the walls of the gas inlet. The floor of the particle receiving section is sharply pitched with an outlet at the lowest point so that the particles, once collected, can be drawn off for re-use or for disposal.

The spinner of the centrifugal particle separator is vertically mounted directly over the gas inlet. The spinner is comprised of a hub and spinner blades. The spinner blades may be securely attached either directly to the walls of the gas inlet or to a support ring which rests on top of the rim of the gas inlet. In either arrangement, the spinner blades extend in a radius approximately equal to the radius of the gas inlets. In an alternative arrangement, the spinner rests on top of the gas inlet, in which case the spinner blades extend beyond the periphery of the gas inlet. In any instance, the spinner blades are attached to the spinner hub and radiate therefrom. The spinner blades may be separable from the hub or may be integrally joined thereto. The greater the radius of the spinner hub the, shorter is the necessary height of the static vanes, but the less predominant is the spiraling or spinning motion imparted to the gas stream.

In the operation of this invention, the gas stream rises in the gas inlet at a substantially vertical velocity. As portions of the gas stream strike the stationary spinner blades, a horizontal angular velocity component is induced in the gas stream. As a result, the gas stream emerges from the spinner blades in a spinning, or spiraling motion. The degree to which angular velocity is induced in the gas stream is largely dependent upon the spinner blade shape. In the preferred embodiment of this invention, the spinner blades have forward surfaces, the upper portions of which form the leading edges of the spinner blades and the lower portions of which form the trailing edges of the spinner blades, and said forward surfaces are curved concavely and at least partially downward. The extent of concavity in this preferred arrangement is not so great that impingement of entrained particles upon the spinner blades will cause the particles to rebound downward. Rather, the concave surface is constructed so that any impinging particles will be reflected in a direction entirely horizontal, or in a direction having both vertical and horizontal directional components. In this manner, although impingement of entrained particles upon the spinner blades is not necessarily desirable, any redirection of the particles resulting from such impingement will aid in their earlier collection.

Although the spinner hub may vary from a mere joinder of the spinner blades to a core which occupies the predominant portion of the cross sectional area of the spinner, a more moderately proportioned spinner is usually desirable. A preferred embodiment of this invention employs a spinner wherein the radius of the spinner hub is nominally one fourth of the radius of the spinner blade sweep, and the vanes extend a vertical distance equal to seven times the radius of the inner portion of said vanes. This height limitation of the vanes is slightly in excess of the height required for all the particles to pass in a spiral from the gas inlet to the vanes, where the horizontal distance to the vanes from the spinner axis is the same as the radius of the spinner blade sweep and the axial velocity component is one half of the total velocity component of each particle.

This invention is illustrated in the accompanying drawings in which.

Figure 1:
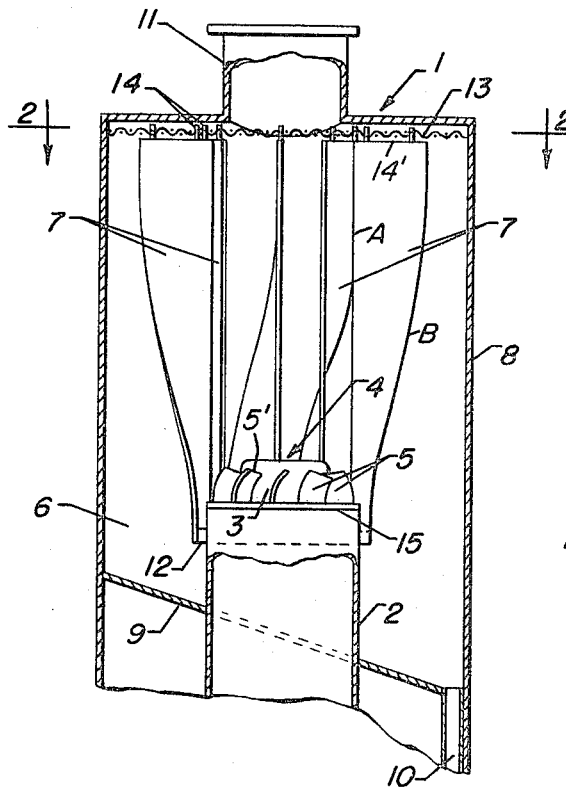
FIG. 1 is a partially cutaway elevational view of a preferred embodiment of this invention.

Referring now to FIG. 1, there is a vertically disposed centrifugal particle separator 1 having a spinner 4 comprised of spinner hub 3 and spinner blades 5. The blades 5 are welded integrally to hub 3 and are welded at points on their outer extremities to support ring 15. Support ring 15 fits over the rim of a particle laden gas inlet 2. This positioning results in spinner 4 being axially mounted with regard to the longitudinal axis of the separator unit (as clearly shown in FIG. 1) over particle laden gas inlet 2. The surfaces of spinner blades 5 form leading edges, at the top, as at 5' and terminate in lower, trailing edges. The surfaces in between such leading and trailing edges are open concavely downward and to the right, as viewed in FIG. 1. Mounted around the circumference of gas inlet 2 radially outward from spinner 4 are a multiplicity of static vanes 7. The lower portion of vanes 7 at the vertical edges A are welded to the walls of gas inlet 2, thus securing the lower portions of vanes 7 in place. Since it is desirable for the lower portions of vanes 7 to be positioned slightly further radially outward from gas inlet 2, spacing blocks 12 are wedged between these lower edges or terminal portions at the edges C of vanes 7 and the walls of gas inlet 2. Spacing blocks 12 may be any shape and are held in place by the compressive forces of the vanes and the walls of gas inlet 2. The upper edges of vanes 7, indicated at 14', are laterally secured by a mesh or coarse screen or semi-rigid netting 13. From the top edges 14' of vanes 7, rodlike extensions 14 extend vertically upward through the holes in mesh 13. These are two rodlike extensions 14 from each vane 7, one extending from nearer the inner vertical edge A and the other nearer the outer vertical edge B. These extensions 14 are engaged by the holes in mesh 13 and are thereby laterally restrained. Mesh 13 is flexible enough to be partially lifted to rearrange or adjust individual vanes 7 by engaging different holes in mesh 13 with the rodlike extensions 14. Mesh 13 is rigid enough to effectively restrain the vanes 7 from lateral movement once extensions 14 are engaged in mesh 13. The holes in mesh 13 are large enough to prevent a pressure drop across the mesh and large enough to engage extensions 14, yet small enough to prevent large entrained particles from escaping through an overhead processed gas outlet or exhaust 11, which is positioned axially over spinner 4 and above mesh 13. A particle retaining section 6 is the space formed by the inner walls of the outer shell 8 of the centrifugal particle separator 1 and the outer surfaces of vanes 7 and the outer surface of gas inlet 2. Floor 9 of particle receiving section 6 is canted so that the particles in particle receiving section 6 are easily withdrawn through particle outlet 10 in floor 9. In FIG. 1, several of the static vanes 7 are removed, so as not to obscure the view of spinner 4.

In the operation of the centrifugal particle separator, a particle laden gas stream is introduced to centrifugal particle separator 1 through gas inlet 2. The gas stream ascends between the blades 5 of spinner 4, which imparts to the gas stream a spiraling motion. This spiraling pattern of flow 2 causes solid entrained particles to be centrifugally thrown toward vanes 7, whereupon the particles either pass between vanes 7 or impinge upon vanes 7 and then pass between vanes 7 into particle receiving section 6, where no gas flow exists. Once out of the gas flow, the particles fall to the bottom of particle receiving section 6 and are withdrawn through particle outlet 10. The cleaned gas, free from particles, passes through mesh 13 and overhead processed gas outlet 11, from where it is released to the atmosphere.

Figure 2:
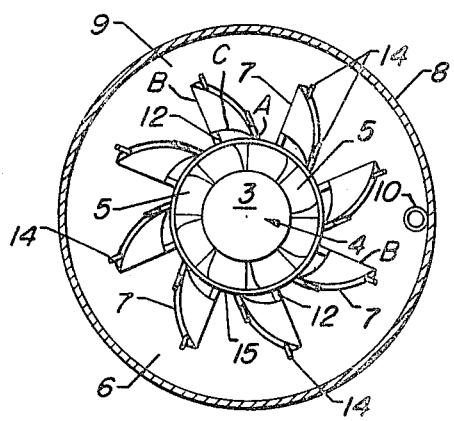
FIG. 2 is a sectional view of a portion of the embodiment in FIG. 1.

The arrangement of the vanes 7, the spinner hub 3, and spinner blades 5, are further illustrated in FIG. 2. The inner surfaces of the lower lateral edges C of vanes 7 adjacent to the spinner are welded to the gas inlet near such bottom edges. Each inner face or surface of each vane is constructed as a section of a helix and extends throughout a length approaching one quarter of one pitch of this helix.

The top edge 14' of each vane approaches radial alignment with respect to spinner 4 and the bottom edge C of each approaches tangential alignment with respect to spinner 4. The outer edges B of each vane 7 is so curved that such outer edge B extends farther radially than does the longitudinal edge A of the same vane.

Figure 3:
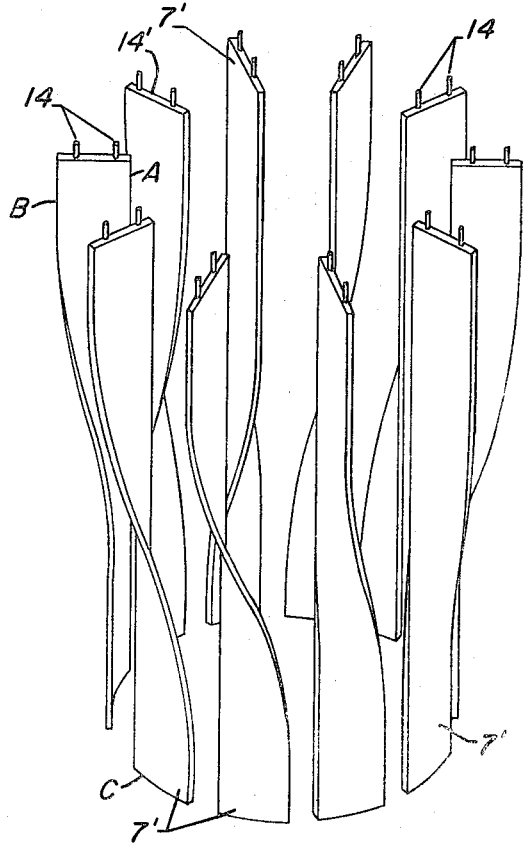
FIG. 3 is a perspective view of a portion of another embodiment of the invention.

The helical shape of the vanes is more clearly illustrated in FIG. 3, which is a perspective view of vanes 7 isolated from the rest of the centrifugal particle separator. In this embodiment it can be seen that the top edges 14' of the vanes 7' approach radial alignment with respect to the spinner axis, and the bottom edges of the vanes 7' approach tangential alignment with respect to the spinner axis. In this manner, vanes 7' are shaped substantially as one quarter of a helix.

The embodiments described in the drawings are not to be considered as limiting this invention thereto. Neither to be considered limited are the static vane shapes, static vane securing means (both top and bottom), spinner blade shapes, spinner hub sizes, spinner design, number of static vanes, number of spinner blades, particle outlets, nor particle receiving sections described herein.

I claim as my invention:

1. In a centrifugal particle separator, the combination comprising a vertically disposed outer shell having a gas inlet means, said gas inlet means being axially disposed with respect to the longitudinal axis of said outer shell, said gas inlet means terminating in an outlet intermediate the ends of said casing, a static spinner provided with spinner blades mounted over said outlet, a multiplicity of static vanes positioned concentrically around said static spinner and extending vertically upward from, said outlet, the inner wall of said outer shell and the outer wall of said gas inlet means forming a particle retaining section therebetween, each of said spinner blades having an upper leading edge and a lower trailing edge forming surface therebetween which from top to bottom is concavely curved, each of said vertically upward extending static vanes having upper and lower edges providing a helical surface therebtween comprising a section of a helix having an angular disposition throughout its length approximately one quarter of one pitch of said helix, said static vanes being in direct straight line flow relationship with said spinner blades, and an overhead processed gas outlet at the upper end of said casing, whereby relatively dense entrained particles are thrown towards the static vanes by the centrifugal force from the spiraling motion in the gas stream as induced by said spinner blades, and are deflected into said particle retaining section.

2. The apparatus of claim 1 further characterized in that said upper edge of said vanes approaches radial alignment with respect to said spinner and the bottom edge of said vanes approaches tangential alignment with respect to said spinner.

3. The apparatus of claim 1 further characterized in that the outer longitudinal edge of each vane extends farther in the direction of the leading edges of said spinner blades than does the inner longitudinal edge of the same vane.

4. The apparatus of claim 1 further characterized in that the radius of the spinner hub is nominally one fourth of the radius of the spinner blade sweep, and the vanes extend a vertical distance equal to seven times the radius of the inner portion of said vanes.

References Cited

UNITED STATES PATENTS

| | | | |
|---|---|---|---|
| 6,187 | 3/1849 | McCleary | 55—455 X |
| 1,038,707 | 9/1912 | Yeomans | 55—398 |
| 1,372,714 | 3/1921 | Milliken | 55—347 |
| 2,201,301 | 5/1940 | Richardson | 55—397 |
| 3,216,182 | 11/1965 | Cochran et al. | 55—457 X |

FOREIGN PATENTS

| | | |
|---|---|---|
| 1,033,954 | 4/1953 | France. |
| 821,574 | 10/1959 | Great Britain. |
| 901,290 | 7/1962 | Great Britain. |

DENNIS E. TALBERT JR., Primary Examiner

U.S. Cl. X.R.

55—399, 457; 110—119